(12) United States Patent
Okada et al.

(10) Patent No.: US 9,617,650 B2
(45) Date of Patent: Apr. 11, 2017

(54) CATIONIC ELECTRODEPOSITION COATING COMPOSITION AND COATED ARTICLE

(75) Inventors: Eisaku Okada, Okazaki (JP); Kouji Takezoe, Miyoshi (JP); Hirokazu Hayashi, Miyoshi (JP)

(73) Assignees: TOYOTA JIDOSHA KABUSHIKI KAISHA, Aichi (JP); KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/113,444

(22) PCT Filed: Apr. 4, 2012

(86) PCT No.: PCT/JP2012/059258
§ 371 (c)(1),
(2), (4) Date: Oct. 23, 2013

(87) PCT Pub. No.: WO2012/147478
PCT Pub. Date: Nov. 1, 2012

(65) Prior Publication Data
US 2014/0042031 A1    Feb. 13, 2014

(30) Foreign Application Priority Data
Apr. 28, 2011   (JP) .................................. 2011-101644

(51) Int. Cl.
| | | |
|---|---|---|
| *B41M 5/20* | (2006.01) | |
| *C25D 7/00* | (2006.01) | |
| *C25D 3/00* | (2006.01) | |
| *C25D 9/02* | (2006.01) | |
| *C08G 18/64* | (2006.01) | |
| *C08G 18/80* | (2006.01) | |
| *C09D 5/44* | (2006.01) | |
| *C09D 175/12* | (2006.01) | |
| *C08G 59/18* | (2006.01) | |
| *C09D 7/12* | (2006.01) | |
| *C25D 13/20* | (2006.01) | |

(52) U.S. Cl.
CPC .............. *C25D 9/02* (2013.01); *C08G 18/643* (2013.01); *C08G 18/8064* (2013.01); *C08G 59/184* (2013.01); *C09D 5/44* (2013.01); *C09D 5/4488* (2013.01); *C09D 7/1208* (2013.01); *C09D 175/12* (2013.01); *C25D 13/20* (2013.01)

(58) Field of Classification Search
CPC ...... C09D 5/44; C09D 5/4488; C09D 175/12; C09D 7/1208; C25D 9/02; C25D 13/20; C08G 18/643; C08G 18/8064; C08G 59/184
USPC ..................................... 528/88; 205/50, 235
See application file for complete search history.

(56) References Cited

U.S. PATENT DOCUMENTS

| | | |
|---|---|---|
| 4,594,403 A | 6/1986 | Kempter et al. |
| 7,560,162 B2 | 7/2009 | Nishiguchi et al. |
| 7,906,002 B2 | 3/2011 | Shimoda et al. |
| 2006/0211831 A1 | 9/2006 | Nishiguchi et al. |
| 2008/0254283 A1 | 10/2008 | Shimoda |
| 2011/0062026 A1 | 3/2011 | Nishiguchi et al. |
| 2011/0068009 A1 | 3/2011 | Okada et al. |
| 2011/0098009 A1 | 4/2011 | Marholev et al. |

FOREIGN PATENT DOCUMENTS

| | | |
|---|---|---|
| CN | 102020907 | 4/2011 |
| JP | 61-12716 | 1/1986 |
| JP | 2000-513762 | 10/2000 |
| JP | 2004-519542 | 7/2004 |
| JP | 2008-144181 | 6/2006 |
| JP | 2006-257268 | 9/2006 |
| JP | 2008-510042 | 4/2008 |
| JP | 2008-196043 | 8/2008 |
| JP | 2008-229433 | 10/2008 |
| JP | 2008-274392 | 11/2008 |
| JP | 2009-179859 | 8/2009 |
| JP | 2009-280884 | 12/2009 |
| WO | 98/10024 | 3/1998 |
| WO | 02/070613 | 9/2002 |
| WO | 2004/031306 | 4/2004 |
| WO | 2006/026448 | 3/2006 |
| WO | 2009/145203 | 12/2009 |

OTHER PUBLICATIONS

International Search Report issued Jun. 26, 2012 in International (PCT) Application No. PCT/JP2012/059258.

*Primary Examiner* — David Karst
(74) *Attorney, Agent, or Firm* — Wenderoth, Lind & Ponack, L.L.P.

(57) ABSTRACT

The present invention provides a cationic electrodeposition coating composition comprising: a specific amino group-containing modified epoxy resin (A); a blocked polyisocyanate curing agent (B); a water-soluble zirconium compound (C); and sulfamic acid, wherein the water-soluble zirconium compound (C) is present in an amount of 10 to 10,000 ppm, calculated as the mass of the elemental zirconium, relative to the mass of the cationic electrodeposition coating composition.

2 Claims, No Drawings

CATIONIC ELECTRODEPOSITION COATING COMPOSITION AND COATED ARTICLE

TECHNICAL FIELD

Cross Reference to Related Application

This application claims the benefit of priority to Japanese Patent Application No. 2011-101644, filed on Apr. 28, 2011, the entire disclosure of which is hereby incorporated by reference in its entirety.

The present invention relates to a cationic electrodeposition coating composition that is excellent in terms of the amount of zirconium deposited on a substrate to be coated, and excellent in corrosion resistance, particularly in hot salt water immersion resistance, on a non-treated steel plate.

BACKGROUND ART

Because a cationic electrodeposition coating is excellent in throwing power and causes little environmental pollution, it is used in a wide range of applications, such as primer coatings for automobiles. A cationic electrodeposition coating composition containing a lead compound or a chromium compound, such as lead chromate, basic lead silicate, and strontium chromate, has been heretofore proposed.

However, the use of heavy metal compounds, such as lead compounds and chromium compounds, has recently been restricted for environmental reasons, and cationic electrodeposition coating compositions that have excellent anti-corrosion properties and cause no environmental problems, without containing such heavy metal compounds but using a rust preventive pigment, have been developed and put in practical use.

For example, Patent Literature 1 discloses an electrodeposition coating method that employs multistage electrification, using an electrodeposition coating composition comprising: a resin component (A) obtained by reacting an epoxy resin (b1) having, in one molecule thereof, at least two specific epoxy-containing functional groups, and an amino compound (b2), and/or a phenolic compound (b3); a resin component (B) having a specific structural unit; a blocked polyisocyanate compound (C); and at least one rust inhibiting component (D) selected from the group consisting of metal ions selected from zirconium, titanium, cobalt, vanadium, tungsten and molybdenum, oxymetal ions of the metal, and fluorometal ions of the metal.

As another example, Patent Literature 2 discloses a method for forming a surface-treating film, which comprises applying a film-forming agent onto a metal substrate by a multistage electricity-applying system, the film-forming agent comprising: a zirconium compound; where necessary, a compound containing at least one metal, which is selected from titanium, cobalt, vanadium, tungsten, molybdenum, copper, zinc, indium, aluminum, bismuth, yttrium, lanthanide metals, alkali metals and alkaline earth metals; and a resin component.

However, the coating composition and the film-forming agent disclosed in Patent Literature 1 and Patent Literature 2, respectively, are not sufficient in terms of the amount of zirconium deposited on the substrate to be coated, and inferior in corrosion resistance, particularly, in hot salt water immersion resistance, on a non-treated steel plate.

For this reason, there has been a demand for a cationic electrodeposition coating composition that is sufficient in terms of the amount of zirconium deposited on the substrate to be coated, and excellent in corrosion resistance, particularly, in hot salt water immersion resistance, on a non-treated steel plate.

CITATION LIST

Patent Literature

PTL 1: JP2006-257268A
PTL 2: JP2008-274392A

SUMMARY OF INVENTION

Technical Problem

An object of the present invention is to find a cationic electrodeposition coating composition that is excellent in terms of the amount of zirconium deposited on the substrate to be coated, and excellent in corrosion resistance, particularly, in hot salt water immersion resistance, of a film formed on a non-treated steel plate.

Solution to Problem

The present inventors conducted extensive research to solve the problem, and completed the present invention by finding that the problem is solved by a cationic electrodeposition coating composition comprising a specific amino group-containing modified epoxy resin (A); a blocked polyisocyanate curing agent (B); a water-soluble zirconium compound (C); and sulfamic acid, in which the content of the water-soluble zirconium compound (C) is 10 to 10,000 ppm, calculated as the mass of the elemental zirconium, relative to the mass of the cationic electrodeposition coating composition.

Specifically, the present invention relates to the following items.

Item 1. A cationic electrodeposition coating composition comprising: an amino group-containing modified epoxy resin (A); a blocked polyisocyanate curing agent (B); a water-soluble zirconium compound (C); and sulfamic acid, the cationic electrodeposition coating composition comprising the water-soluble zirconium compound (C) in an amount of 10 to 10,000 ppm, calculated as the mass of the elemental zirconium, relative to the mass of the cationic electrodeposition coating composition, and the amino group-containing modified epoxy resin (A) being a resin prepared by reacting an epoxy resin (A1) with an amino group-containing compound (a4), the epoxy resin (A1) being prepared by reacting a diepoxide compound (a1), a bisphenol-type epoxy resin (a2) and a bisphenol compound (a3), the diepoxide compound (a1) being represented by the following formula (1),

[Chem. 1]

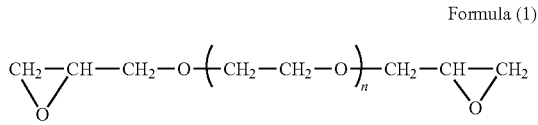

Formula (1)

wherein n represents an integer of 1 to 50.

Item 2. A coated article obtained by immersing a substrate to be coated in a bath of the cationic electrodeposition coating composition according to item 1, and performing electrodeposition coating thereon.

Item 3. A method for forming a film, the method comprising the steps of:

immersing a substrate to be coated in a bath of the cationic electrodeposition coating composition according to item 1; and applying electricity to the immersed substrate to be coated.

Advantageous Effects of Invention

Although not containing heavy metals, such as lead compounds and chromium compounds, the cationic electrodeposition coating composition of the present invention can provide a coated article excellent in corrosion resistance, particularly in hot salt water immersion resistance, of the film formed on a non-treated steel plate, and excellent in finished appearance.

The reason for this may be that when the substrate to be coated is immersed in the cationic electrodeposition coating composition of the present invention, etching takes place on the substrate to be coated and a dense, hardly-soluble film (lower layer) primarily comprising an inorganic component is formed; subsequently, a resin component comprising an amino group-containing modified epoxy resin (A) and a blocked polyisocyanate curing agent (B) is deposited on the lower-layer film, thereby forming an upper-layer film primarily comprising an organic component.

Due to this composite film comprising a lower-layer film and an upper-layer film, corrosion resistance, particularly hot salt water immersion resistance at high temperature, on a non-treated steel plate, can be enhanced.

DESCRIPTION OF EMBODIMENTS

The present invention provides a cationic electrodeposition coating composition comprising: a specific amino group-containing modified epoxy resin (A); a blocked polyisocyanate curing agent (B); a water-soluble zirconium compound (C); and sulfamic acid, in which the content of the water-soluble zirconium compound (C) is 10 to 10,000 ppm calculated as the mass of the elemental zirconium, relative to the mass of the cationic electrodeposition coating composition. Hereinafter, the present invention will be described in detail.

Amino Group-Containing Modified Epoxy Resin (A)

The amino group-containing modified epoxy resin (A), which is used as a base resin, is obtained by reacting an epoxy resin (A1) with an amino group-containing compound (a4), the epoxy resin (A1) being obtained by reacting a specific diepoxide compound (a1), a bisphenol-type epoxy resin (a2), and a bisphenol compound (a3).

Diepoxide Compound (a1):

The diepoxide compound (a1) is represented by the following formula (1).

[Chem. 2]

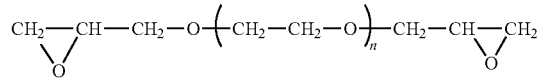

Formula (1)

In the formula (1), n is an integer of 1 to 50, preferably 2 to 24, and more preferably 3 to 14.

From the standpoint of the stability of an aqueous film-forming agent (I) and the water-resistant adhesion property of the obtained film, the diepoxide compound has a molecular weight in the range of preferably 170 to 2,400, more preferably 340 to 1,200, and further more preferably 430 to 800.

Examples of commercially available diepoxide compounds (a1) include Denacol EX 810, Denacol EX 821, Denacol EX 832, Denacol EX 841, Denacol EX 851, and Denacol EX 861 (all manufactured by Nagase ChemteX Corporation; trade names).

Bisphenol-Type Epoxy Resin (a2):

Examples of bisphenol-type epoxy resins (a2) used in the production of an amino group-containing modified epoxy resin (A) include a resin obtained by reacting a polyphenol compound and epihalohydrin. Preferable are those having a number average molecular weight of typically 340 to 2,000, particularly 340 to 1,000, and an epoxy equivalent of typically 170 to 1,500, particularly 170 to 800.

In this specification, the number average molecular weight is the polystyrene equivalent molecular weight determined from the retention time (retention volume) measured by gel permeation chromatography (GPC) relative to the retention time (retention volume) of polystyrene standard with a known molecular weight measured under the same conditions. Specifically, by using the HLC8120GPC gel permeation chromatography apparatus (manufactured by Tosoh Corporation; trade name), four columns (TSKgel G-4000HXL, TSKgel G-3000HXL, TSKgel G-2500HXL and TSKgel G-2000HXL; trade names; all manufactured by Tosoh Corporation), and a differential refractometer (detector), measurement can be carried out under the following conditions: the mobile phase is tetrahydrofuran, the measurement temperature is 40° C., and the flow rate is 1 mL/min.

Examples of polyphenol compounds used in the production of the bisphenol-type epoxy resins (a2) include bis(4-hydroxyphenyl)-2,2-propane[bisphenol A], bis(4-hydroxyphenyl)methane[bisphenol F], bis(4-hydroxycyclohexyl)methane[hydrogenated bisphenol F], 2,2-bis(4-hydroxycyclohexyl)propane[hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-2 or 3-tert-butyl-phenyl)-2,2-propane, bis(2-hydroxynaphthyl)methane, tetra(4-hydroxyphenyl)-1,1,2,2-ethane, 4,4'-dihydroxy diphenylsulfone, and cresolnovolak.

Among the bisphenol-type epoxy resins (a2), preferable is an epoxy resin that is derived from bisphenol A and represented by the following formula (2):

[Chem. 3]

Formula (2)

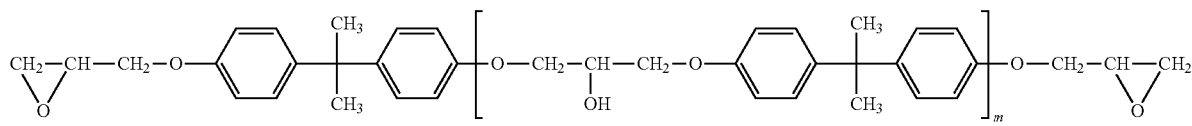

wherein m represents an integer of 0 to 8, preferably 1 to 5, and more preferably 2 to 4.

Examples of commercially available epoxy resins include jER828EL, jER1002, and jER1004 (all manufactured by Japan Epoxy Resin Co., Ltd.; trade names).

Bisphenol Compound (a3):

The bisphenol compound (a3) used in the production of amino group-containing modified epoxy resin (A) includes a compound represented by the following general formula (3):

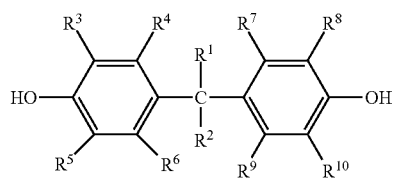

[Chem. 4]

wherein $R^1$, $R^2$, $R^3$, $R^4$, $R^5$, $R^6$, $R^7$, $R^8$, $R^9$, and $R^{10}$ each represent a hydrogen atom or an alkyl group having 1 to 6 carbon atoms. Examples of the alkyl group having 1 to 6 carbon atoms represented by $R^1$, $R^2$, $R^3$, $R^4$, $R^5$, $R^6$, $R^7$, $R^8$, $R^9$, and $R^{10}$ include a straight-chain or a branched-chain alkyl group having 1 to 6 carbon atoms, and preferably 1 to 3 carbon atoms, such as methyl, ethyl, propyl, isopropyl, 2,2-dimethylpropyl, 1-ethylpropyl, butyl, isobutyl, tert-butyl, isopentyl, pentyl, and hexyl. Examples of the bisphenol compounds (a3) specifically include bis(4-hydroxyphenyl)-2,2-propane[bisphenol A], and bis(4-hydroxyphenyl)methane[bisphenol F].

Epoxy Resin (A1):

The epoxy resin (A1) can be produced by conducting an addition reaction of the aforementioned diepoxide compound (a1), bisphenol-type epoxy resin (a2), and bisphenol compound (a3). The addition reaction can be conducted according to a method known per se.

Specifically, the epoxy resin (A1) can be obtained by mixing a diepoxide compound (a1), a bisphenol-type epoxy resin (a2), and a bisphenol compound (a3) in the presence of a catalyst, such as a titanium compound, e.g., tetrabutoxytitanium and tetra propoxytitanium; an organic tin compound, e.g., tin octylate, dibutyltin oxide, dibutyltin laurate; and a metallic compound, e.g., stannous chloride, and heating the mixture at a temperature of about 100° C. to about 250° C. for about 1 hour to about 15 hours.

The catalyst can be used typically in an amount of 0.5 to 1,000 ppm based on the total amount of the diepoxide compound (a1), the bisphenol-type epoxy resin (a2), and the bisphenol compound (a3).

The diepoxide compound (a1) is preferably used in an amount in the range of 20 to 70% by mass, particularly 25 to 68% by mass, and still particularly 30 to 65% by mass, based on the total solids content of the diepoxide compound (a1), the bisphenol-type epoxy resin (a2), and the bisphenol compound (a3), from the standpoint of electrodeposition coatability and stability.

The bisphenol-type epoxy resin (a2) is used in an amount in the range of typically 11 to 53% by mass, particularly 13 to 48% by mass, and still particularly 16 to 42% by mass, based on the total solids content of the diepoxide compound (a1), the bisphenol-type epoxy resin (a2), and the bisphenol compound (a3), from the standpoint of electrodeposition coatability and stability.

The addition reaction is ordinarily conducted in a solvent, and examples of the solvent to be used include: hydrocarbon solvents, such as toluene, xylene, cyclohexane, and n-hexane; ester solvents, such as methyl acetate, ethyl acetate and butyl acetate; ketone solvents, such as acetone, methyl ethyl ketone, methyl isobutyl ketone and methyl amyl ketone; amide solvents, such as dimethylformamide and dimethylacetamide; alcohol solvents, such as methanol, ethanol, n-propanol and isopropanol; ether solvents, such as ethylene glycol monobutyl ether and diethylene glycol monoethyl ether; or a mixture thereof.

Amino Group-Containing Compound (a4):

The amino group-containing compound (a4) that is reacted with an epoxy resin (A1) is not particularly limited in the type thereof, insofar as the amino group-containing compound (a4) includes at least one active hydrogen that reacts with an epoxy group, and can introduce amino groups into the epoxy resin (a) to thereby cationize the epoxy resin (A1). Amino group-containing compounds heretofore used in cationization of epoxy resins can be used similarly, and examples specifically include: ketiminized products of ethanolamine, propanolamine, hydroxyethylamino propylamine, diethylenetriamine, triethylenetetramine, tetraethylenepentamine, pentaethylenehexamine and the like; diethanolamine; di(2-hydroxypropyl)amine; monomethylamino ethanol; and monoethylamino ethanol.

From the standpoint of water dispersibility and corrosion resistance, a proportion of the amino group-containing compound (a4) is in the range of preferably 5 to 25% by mass, and more preferably 6 to 20% by mass, based on the total solids content of the diepoxide compound (a1), the bisphenol-type epoxy resin (a2), the bisphenol compound (a3) and the amino group-containing compound (a4).

An amino group-containing modified epoxy resin (A) can be obtained by subjecting the above-mentioned epoxy resin (A1) and amino group-containing compound (a4) to an addition reaction by a method known per se. The addition reaction can be conducted in a suitable solvent at about 80° C. to about 170° C., and preferably at about 90° C. to about 150° C., for 1 to 6 hours, and preferably for 1 to 5 hours.

The amino group-containing modified epoxy resin (A) thus obtained has a number average molecular weight in the range of typically 600 to 3,000, and particularly preferably 1,000 to 2,500.

The aforementioned amino group-containing modified epoxy resin (A) comprises an amino group as a group that can be cationized, and can be neutralized by sulfamic acid to be water soluble or water-dispersed.

A feature of the present invention is that combining a water-soluble zirconium compound (C) with sulfamic acid increases the amount of zirconium deposited on the substrate to be coated and produces an excellent effect of imparting enhanced corrosion resistance to a non-treated steel plate.

Blocked Polyisocyanate Curing Agent (B)

In the cationic electrodeposition coating composition of the present invention, the use of the aforementioned amino group-containing modified epoxy resin (A) in combination with a blocked polyisocyanate curing agent (B) affords a thermosetting cationic electrodeposition coating composition.

The blocked polyisocyanate curing agent (B) is a product generated through an addition reaction of a polyisocyanate compound and an isocyanate blocking agent in stoichiometric amounts. The polyisocyanate compound used for the blocked polyisocyanate curing agent (B) can be a known compound. Examples thereof include aromatic, aliphatic or alicyclic polyisocyanate compounds, such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI[polymethylene polyphenyl isocyanate], bis(isocyanatemethyl)cyclohexane, tetramethylene di-isocyanate, hexamethylene diisocyanate, methylene diisocyanate and isophorone diisocyanate; cyclopolymers or biurets of these polyisocyanate compounds; and a combination thereof.

In particular, aromatic polyisocyanate compounds, such as tolylene diisocyanate, xylylene diisocyanate, phenylene diisocyanate, diphenylmethane-2,4'-diisocyanate, diphenylmethane-4,4'-diisocyanate, and crude MDI, are preferable from the standpoint of anti-corrosion properties.

On the other hand, the isocyanate blocking agent is for blocking isocyanate groups of the polyisocyanate compounds through addition to the isocyanate groups, and the blocked polyisocyanate compounds generated through the addition are stable at room temperature. However, it is preferable that when heated to a film-baking temperature (typically 100 to 200° C.), the blocked polyisocyanate compounds dissociate to thereby regenerate free isocyanate groups.

Examples of blocking agents used for the blocked polyisocyanate curing agent (B) include oxime compounds, such as methylethylketoxime and cyclohexanone oxime; phenol compounds, such as phenol, para-t-butylphenol, and cresol; aliphatic alcohols, such as n-butanol and 2-ethylhexanol; aromatic alkyl alcohols, such as phenylcarbinol and methylphenylcarbinol; ether-alcohol compounds, such as ethylene glycol monobutyl ether and diethylene glycol monoethyl ether; lactam compounds, such as ε-caprolactam and γ-butyrolactam; and active methylene compounds, such as diethyl malonate and acetylacetone.

A proportion of the diepoxide compound (a1) is preferably 10 to 35% by mass, and more preferably 15 to 30% by mass, based on the total solids content of the amino group-containing modified epoxy resin (A) and the blocked polyisocyanate curing agent (B) from the standpoint of the stability of the film-forming agent.

Water-Soluble Zirconium Compound (C)

A feature of the present invention is that the cationic electrodeposition coating composition contains a water-soluble zirconium compound (C). Examples of the water-soluble zirconium compounds (C) include zirconium chloride, zirconyl chloride, zirconium sulfate, zirconyl sulfate, zirconium nitrate, zirconyl nitrate, zirconium hydrofluoric acid, zirconium bromide, zirconyl acetate, and zirconyl carbonate.

The concentration of the water-soluble zirconium compound (C) used in the present invention is 10 to 10,000 ppm, preferably 150 to 8,000 ppm, and more preferably 250 to 3,000 ppm, calculated as the mass of the metallic element, relative to the mass of the bath of the cationic electrodeposition coating composition with a view to imparting enhanced anti-corrosion properties to a non-treated steel plate.

The mass of the zirconium element based on the water-soluble zirconium compound (C) is preferably equal to or more than the above-stated lower limit with a view to enhancing the corrosion resistance, particularly hot salt water immersion resistance, of a film formed on a non-treated steel plate. Moreover, the mass of the elemental zirconium relative to the mass of the cationic electrodeposition coating composition is preferably equal to or less than the above-stated upper limit from the standpoint of the stability of the coating composition.

Of the above-mentioned water-soluble zirconium compounds (C), zirconium hydrofluoric acid, when used in combination with sulfamic acid, imparts enhanced corrosion resistance to a non-treated steel plate, and is thus preferable.

Sulfamic Acid

By containing sulfamic acid, the cationic electrodeposition coating composition of the present invention can increase the amount of zirconium deposited, and make the zirconium oxide film of the lower layer, dense and thick. This improves corrosion resistance even in non-treated steel plates.

The content of sulfamic acid in the cationic electrodeposition coating composition is preferably selected in such a manner that the acid concentration (MEQ) attributable to sulfamic acid falls within the range of 8 to 120, and more preferably 10 to 50. Here, setting the acid concentration (MEQ) not smaller than the lower limit of the above-mentioned range is preferable from the viewpoint of preventing film deposition defects. Setting the acid concentration (MEQ) not greater than the upper limit of the above-mentioned range is preferable from the viewpoint of preventing an increase in the amount of gas generated and deterioration of the finish attributable thereto.

MEQ is an abbreviation for mg equivalent, and stands for milligram equivalents of a neutralizer (acid) per 100 g of the solids content of the coating composition. MEQ can be obtained by the following manner. About 10 g of the electrodeposition coating composition is weighed and dissolved in about 50 ml of solvent (THF). The resulting solution is subjected to potentiometric titration using a $\frac{1}{10}$ N NaOH solution to determine the acid content of the electrodeposition coating composition. Then, MEQ is calculated by the formula:

$$\text{MEQ} = [\text{Titration value (ml) of } \tfrac{1}{10} \text{ N NaOH} \times 10] / \text{Solids content of sample (g)}$$

The cationic electrodeposition coating composition of the present invention may contain, if necessary, other neutralizers, such as acetic acid, formic acid, lactic acid, propionic acid, citric acid, malic acid; other additives, such as pigment, catalyst, organic solvent, pigment dispersant, surface control agent, surfactant; etc., in amounts usually used in the field of coating compositions.

Examples of the pigments and catalysts include coloring pigments, such as titanium white, carbon black, etc.; extender pigments, such as clay, talc, baryta, etc.; anticorrosion pigments, such as aluminum dihydrogen tripolyphosphate, aluminum phosphomolybdate, etc.; bismuth compounds, such as bismuth oxide, bismuth hydroxide, bismuth lactate, etc.; organic tin compounds, such as dibutyltin oxide, dioctyltin oxide, etc.; tin compounds including aliphatic or aromatic carboxylates of dialkyltin, such as dibutyltin dilaurate, dioctyltin dilaurete, dibutyltin diacetate, dioctyltin dibenzoate, dibutyltin dibenzoate; etc.

As one example of the method for preparing the cationic electrodeposition coating composition of the present invention, an amino group-containing modified epoxy resin (A), a blocked polyisocyanate curing agent (B), and, if necessary, other additives are added and fully mixed to form a dissolution varnish. Sulfamic acid is added thereto and dispersed in water to give a water-dispersed emulsion. An emulsion containing a water-soluble zirconium compound (C) and pigment-dispersed paste are added to the water-dispersed emulsion.

In production of the cationic electrodeposition coating composition, it may be adjusted, using deionized water or the like, to have a bath solids content of typically 5 to 40% by mass, and preferably 8 to 25% by mass, and a pH of 1.5 to 7.0, and preferably 2.0 to 6.5.

The present invention provides a method for forming a film, the method comprising the steps of:

immersing a substrate to be coated in a bath of the cationic electrodeposition coating composition; and applying electricity to the immersed substrate to be coated.

More specifically, the method of the present invention is as described below:

Film formation using the cationic electrodeposition coating composition of the present invention can be performed by any conventional method without particular limitation. Specific examples thereof include a method wherein a coating film is formed by immersing a substrate to be coated in a bath of the cationic electrodeposition coating composition and applying an electric current thereto (a so-called "single-step method"); and a method wherein a coating film is formed by immersing a substrate to be coated in a bath of the cationic electrodeposition coating composition for a predetermined period of time, and performing, as a subsequent step, electrodeposition coating (a so-called "two-step method").

Examples of the materials for the substrates to be coated include steel plates, such as cold-rolled steel plate, hot dip galvanized steel plate, electro-galvanized steel plate, electrolytic zinc-iron duplex-plated steel plate, and organic composite-plated steel plate; automotive bodies, parts for two-wheeled vehicles, household appliances, and other appliances formed from such steel plates.

The "two-step method" is specifically performed in the manner as described below. A cationic electrodeposition coating composition is placed in a vessel to form a bath, and a metal substrate to be coated is immersed in the bath at a bath temperature of 15 to 55° C., and preferably 20 to 50° C. to form a film. By immersing the substrate for 10 to 600 seconds, and preferably 30 to 480 seconds (Step 1), a dense passivation film can be formed thereon.

Subsequently, by applying an electric current at a voltage of 50 to 400 V, preferably 75 to 370 V, for 60 to 600 seconds, and preferably 80 to 400 seconds (Step 2) using the substrate that was treated in Step 1 as a cathode, a film can be deposited on the substrate.

The temperature of the bath of the cationic electrodeposition coating composition is typically set to 10 to 55° C., and preferably to 20 to 50° C., to enable a deposition film having few defects to be uniformly formed.

The thus obtained multilayer coating film is baked at a substrate surface temperature of 100 to 200° C., and preferably 120 to 180° C., for 5 to 90 minutes, and preferably 10 to 50 minutes.

EXAMPLES

Hereunder, the present invention is explained in detail with reference to Production Examples, Examples and Comparative Examples. However, the scope of the present invention is not limited to these Examples. In the following examples, parts and percentages are by mass unless otherwise stated.

Production of Amine Modified Epoxy Resin (A)

Production Example 1

Production of Amino-Containing Epoxy Resin No. 1 Solution 638.9 parts (solids content) of jER828EL (Note 1), 300.0 parts (solids content) of Denacol EX-821 (Note 2), 404.2 parts of bisphenol A, and 0.2 parts of dimethylbenzylamine were placed in a 2-liter separable flask equipped with a thermometer, a reflux condenser, and a stirrer. The mixture was allowed to react at 130° C. until the epoxy equivalent became 900.

Subsequently, 156.9 parts of diethanolamine was added thereto and the mixture was allowed to react at 120° C. for 4 hours. 375.0 parts of ethylene glycol monobutyl ether was further added thereto to obtain an amino-containing epoxy resin solution No. 1 with a resin solids content of 80% by mass.

The amino-containing epoxy resin solution No. 1 had an amine value of 56 mgKOH/g, number average molecular weight of 2,000, and the proportion (%) of diepoxide compound (a) was 20% by mass.

(Note 1) jER828EL: trade name of an epoxy resin manufactured by Japan Epoxy Resin Co., Ltd.; epoxy equivalent: 190; number average molecular weight: 380.

(Note 2) Denacol EX-821: trade name of an epoxy resin manufactured by Nagase ChemteX Corporation; epoxy equivalent: 185; corresponding to a compound represented by formula (1) wherein n=4.

Production Examples 2 to 4

Production of Amino-Containing Epoxy Resin No. 2 to No. 4 Solutions

Amino-containing epoxy resin No. 2 to No. 4 solutions were obtained in the same manner as in Production Example 1, except that the formulations shown in Table 1 were used. In Table 1, the amounts of jER828EL, Denacol EX-821, and Denacol EX-841 are shown by solids content.

TABLE 1

|  |  |  | Production Example 1 | Production Example 2 | Production Example 3 | Production Example 4 |
|---|---|---|---|---|---|---|
| Amino-containing epoxy resin solution |  |  | No. 1 | No. 2 | No. 3 | No. 4 |
| Resin Component (A) Formulation | jER828EL (Note 1) |  | 638.9 | 337.6 | 789.5 | 505.0 |
|  | Denacol EX-821 (Note 2) |  | 300.0 | 600.0 | 150.0 |  |
|  | Denacol EX-841 (Note 3) |  |  |  |  | 536.0 |
|  | Bis Phenol A |  | 404.2 | 405.5 | 403.6 | 303.0 |
|  | Diethanolamine |  | 156.9 | 156.9 | 156.9 | 156.9 |
|  | Ethylene Glycol Monobutyl Ether |  | 375.0 | 375.0 | 375.0 | 375.0 |

TABLE 1-continued

|  |  | Production Example 1 | Production Example 2 | Production Example 3 | Production Example 4 |
|---|---|---|---|---|---|
| Number | Amine Number (mgKOH/g) | 56 | 56 | 56 | 56 |
|  | Number Average Molecular Weight | 2000 | 2000 | 2000 | 2000 |
|  | Solids Content | 80 | 80 | 80 | 80 |
| Proportion (%) of Diepoxide Compound (a1) |  | 20 | 40 | 10 | 77 |

The values shown in formulation are indicated by part by mass.

(Note 3) Denacol EX-841: trade name of an epoxy resin manufactured by Nagase ChemteX Corporation; epoxy equivalent: 372; corresponding to a compound represented by formula (1) wherein n=13.)

Production Example 5

Production of Amino-Containing Epoxy Resin No. 5 Solution 1,230 parts (solids content) of jER828EL (Note 1), 520 parts of bisphenol A, and 0.2 parts of dimethylbenzylamine were placed in a 2-liter separable flask equipped with a thermometer, a reflux condenser, and a stirrer. The mixture was allowed to react at 130° C. until the epoxy equivalent became 700.

Subsequently, 175 parts of diethanolamine and 65 parts of a ketiminized product of diethylenetriamine obtained by reacting methyl isobutyl ketone with diethylenetriamine was added thereto and the mixture was allowed to react at 120° C. for 4 hours. Thereafter, 355 parts of ethylene glycol monobutyl ether was added to the mixture to obtain amino-containing epoxy resin solution No. 5 with a resin solids content of 80% by mass. The amino-containing epoxy resin solution No. 5 had an amine value of 56 mgKOH/g and number average molecular weight of 2,000.

Production of Blocked Polyisocyanate Curing Agent (B)

Production Example 6

Production Example of Curing Agent 270 parts of Cosmonate M-200 (Note 4) and 127 parts of methyl isobutyl ketone were placed in a reaction vessel and heated to 70° C. 236 parts of ethylene glycol monobutyl ether was added thereto dropwise over a period of 1 hour, and the mixture was heated to 100° C. While maintaining this temperature, the mixture was sampled over time. When no absorption by unreacted isocyanate groups was observed by infrared absorption spectrometry, a curing agent with a resin solids content of 80% was obtained.

(Note 4) Cosmonate M-200: trade name of crude MDI, manufactured by Mitsui Chemicals, Inc.

Production Example 7

Production Example of Resin for Pigment Dispersion 390 parts of bisphenol A, 240 parts of Placcel 212 (Note 5), and 0.2 parts of dimethylbenzylamine were added to 1,010 parts (solids content) of jER828EL (see Note 1). The mixture was allowed to react at 130° C. until the epoxy equivalent became about 1,090.

Subsequently, 134 parts of dimethylethanolamine and 150 parts of a 90% aqueous lactic acid solution were added thereto, and the mixture was reacted at 120° C. for 4 hours. Methyl isobutyl ketone was subsequently added to the reaction mixture to adjust its solids content to obtain a resin for pigment dispersion with a solids content of 60%.

(Note 5) Placcel 212: trade name of polycaprolactonediol manufactured by Daicel Chemical Industries; weight average molecular weight: about 1,250.

Production Example 8

Production Example of Pigment-Dispersed Paste 8.3 parts (solids content: 5 parts) of the resin for pigment dispersion with a solids content of 60% obtained in Production Example 7, 14.5 parts of titanium oxide, 7.0 parts of refined clay, 0.3 parts of carbon black, 1 part of dioctyltin oxide, 1 part of bismuth hydroxide, and 20.3 parts of deionized water were added. The mixture was dispersed in a ball mill for 20 hours. A pigment-dispersed paste with a solids content of 55% was thus obtained.

Production of Emulsion

Production Example 9

Production Example of Emulsion No. 1

87.5 parts of the amine added epoxy resin solution No. 1 (solids content: 70 parts) obtained in Production Example 1, and 37.5 parts of the curing agent (solids content: 30 parts) obtained in Production Example 6 were mixed, and 34.6 parts of 10% sulfamic acid was further added to the mixture. After the mixture was uniformly stirred, 134.4 parts of deionized water was added dropwise with vigorous stirring over a period of about 15 minutes to obtain emulsion No. 1 with a solids content of 34%.

Production Examples 10 to 16

Production of Emulsions No. 2 to No. 8

Emulsions No. 2 to No. 8 were obtained in the same manner as in Production Example 9, except that the formulations shown in Table 2 were used.

TABLE 2

|  |  | Production Example 9 | Production Example 10 | Production Example 11 | Production Example 12 | Production Example 13 | Production Example 14 | Production Example 15 | Production Example 16 |
|---|---|---|---|---|---|---|---|---|---|
| Emulsion |  | No. 1 | No. 2 | No. 3 | No. 4 | No. 5 | No. 6 | No. 7 | No. 8 |
| Component A | Amino-containing epoxy resin solution No. 1 (Diepoxide Content 20%) | 87.5 (70) |  |  |  |  | 87.5 (70) |  |  |
|  | Amino-containing epoxy resin solution No. 2 (Diepoxide Content 40%) |  | 87.5 (70) |  |  |  |  | 87.5 (70) |  |
|  | Amino-containing epoxy resin solution No. 3 (Diepoxide Content 10%) |  |  | 87.5 (70) |  |  |  |  | 87.5 (70) |
|  | Amino-containing epoxy resin solution No. 4 (Diepoxide Content 77%) |  |  |  | 87.5 (70) |  |  |  |  |
|  | Amino-containing epoxy resin solution No. 5 (Diepoxide Content 0%) |  |  |  |  | 87.5 (70) |  |  |  |
| B | Curing Agent Solids Content 80% | 37.5 (30) | 37.5 (30) | 37.5 (30) | 37.5 (30) | 37.5 (30) | 37.5 (30) | 37.5 (30) | 37.5 (30) |
| Neutralizer | 10% Sulfamic Acid | 34.6 | 34.6 | 34.6 | 34.6 | 34.6 |  |  |  |
|  | 10% Formic Acid |  |  |  |  |  | 16.4 | 16.4 | 16.4 |
| Deionized Water |  | 152.9 | 152.9 | 152.9 | 152.9 | 152.9 | 171.1 | 171.1 | 171.1 |
| 32% Emulsion |  | 312.5 (100) | 312.5 (100) | 312.5 (100) | 312.5 (100) | 312.5 (100) | 312.5 (100) | 312.5 (100) | 312.5 (100) |
| Proportion (%) of Diepoxide Compound (a1) in A + B |  | 14 | 28 | 7 | 54 | 0 | 14 | 28 | 7 |

The values indicate the amount of components, and the values in parentheses are solids content.

Production of Cationic Electrodeposition Coating Composition

Example 1

312.5 parts (solids content: 100 parts) of Emulsion No. 1, 52.4 parts (solids content: 28.8 parts) of the 55% pigment-dispersed paste obtained in Production Example 8, and 635.1 parts of deionized water were mixed to obtain 1,000 parts of a bath. Subsequently, 14.0 parts of 10% zirconium hydrofluoric acid was added thereto to obtain cationic electrodeposition coating composition No. 1.

Examples 2 to 5

Cationic electrodeposition coating compositions No. 2 to No. 5 were obtained in the same manner as in Example 1 except that the formulations shown in Table 3 were used.

TABLE 3

|  |  | Example 1 | Example 2 | Example 3 | Example 4 | Example 5 |
|---|---|---|---|---|---|---|
| Cationic Electrodeposition Coating Composition |  | No. 1 | No. 2 | No. 3 | No. 4 | No. 5 |
| EM | Emulsion No. 1. | 312.5 (100) |  |  |  | 312.5 (100) |
|  | Emulsion No. 2. |  | 312.5 (100) |  |  |  |
|  | Emulsion No. 3. |  |  | 312.5 (100) |  |  |
|  | Emulsion No. 4. |  |  |  | 312.5 (100) |  |
| PP | Pigment-Dispersed Paste | 52.4 (28.8) | 52.4 (28.8) | 52.4 (28.8) | 52.4 (28.8) | 52.4 (28.8) |
| Deionized Water |  | 635.1 | 635.1 | 635.1 | 635.1 | 635.1 |
| Sum |  | 1000 (128.8) | 1000 (128.8) | 1000 (128.8) | 1000 (128.8) | 1000 (128.8) |
| Component C | 10% Zirconium Hydrofluoric Acid $H_2ZrF_6$ | 14.0 (1.4) | 14.0 (1.4) | 14.0 (1.4) | 14.0 (1.4) | — |
|  | 10% Zirconyl Nitrate $ZrO(NO_3)_2$ | — | — | — | — | 15.0 (1.5) |
| Acid Concentration Attributable to Sulfamic Acid (MEQ) |  | 27.7 | 27.7 | 27.7 | 27.7 | 27.7 |

The values in parentheses indicate solids content.

Comparative Examples 1 to 6

Cationic electrodeposition coating compositions No. 6 to No. 11 were obtained in the same manner as in Example 1 except that the formulations shown in Table 4 were used.

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Cationic Electrodeposition Coating Composition |  | No. 6 | No. 7 | No. 8 | No. 9 | No. 10 | No. 11 |
| EM | Emulsion No. 5 | 312.5 (100) |  |  |  |  |  |
|  | Emulsion No. 6 |  | 312.5 (100) |  |  |  |  |
|  | Emulsion No. 7 |  |  | 312.5 (100) |  |  |  |
|  | Emulsion No. 8 |  |  |  | 312.5 (100) |  |  |
|  | Emulsion No. 1 |  |  |  |  | 312.5 (100) |  |
|  | Emulsion No. 2 |  |  |  |  |  | 312.5 (100) |
| PP | Pigment-Dispersed Paste | 52.4 (28.8) | 52.4 (28.8) | 52.4 (28.8) | 52.4 (28.8) | 52.4 (28.8) | 52.4 (28.8) |
| Deionized Water |  | 635.1 | 635.1 | 635.1 | 635.1 | 635.1 | 635.1 |
| Sum |  | 1000 (128.8) | 1000 (128.8) | 1000 (128.8) | 1000 (128.8) | 1000 (128.8) | 1000 (128.8) |
| Component C | 10% Zirconium Hydrofluoric Acid $H_2ZrF_6$ | 14.0 (1.4) | 14.0 (1.4) | 14.0 (1.4) | 14.0 (1.4) | — | — |
|  | 10% Zirconyl Nitrate $ZrO(NO_3)_2$ | — | — | — | — | — | — |
| Acid Concentration (MEQ) |  | 27.7 | 27.7 | 27.7 | 27.7 | 27.7 | 27.7 |

The values in parentheses indicate solids content.

Substrates to be Coated

Cold rolled steel plates (70 mm×150 mm×0.8 mm) that had not been subjected to chemical conversion treatment were immersed in an ultrasonic cleaner containing toluene, and subjected to ultrasonic degreasing for 30 minutes, thereby obtaining substrates to be coated.

Production of Test Plate and Evaluation

The substrates to be coated were immersed (Step 1) for 120 seconds each in baths each containing one of the cationic electrodeposition coating compositions No. 1 to No. 11 whose temperature was adjusted to 40° C. Subsequently, electrodeposition coating (Step 2) was performed while adjusting the current application time at a voltage of 200 V so as to have a total dry film thickness of the lower-layer film and the upper-layer film of 15 μm.

Thereafter, the resulting films were baked at 170° C. for 20 minutes to obtain test plates. Each test plate was evaluated under the conditions described below. Table 5 shows the results of the Examples and Table 6 shows the results of the Comparative Examples.

TABLE 5

|  |  |  | Example 1 | Example 2 | Example 3 | Example 4 | Example 5 |
|---|---|---|---|---|---|---|---|
| Cationic Electrodeposition Coating Composition |  |  | No. 1 | No. 2 | No. 3 | No. 4 | No. 5 |
| Salt Spray Resistance |  | (Note 6) | S | S | A | A | S |
| Hot Salt Water Immersion Resistance |  | (Note 7) | S | S | A | A | S |
| Coating Film Condition | Film Condition | (Note 8) | A | A | A | A | A |
|  | Zirconium Metallic Content (%) | (Note 9) | 70 | 75 | 70 | 70 | 70 |

TABLE 6

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Cationic Electrodeposition Coating Composition |  |  | No. 6 | No. 7 | No. 8 | No. 9 | No. 10 | No. 11 |
| Salt Spray Resistance |  | (Note 6) | B | A | A | A | C | C |
| Hot Salt Water Immersion Resistance |  | (Note 7) | B | B | B | B | C | C |
| Coating Film Condition | Film Condition | (Note 8) | A | A | A | A | C | C |
|  | Zirconium Metallic Content (%) | (Note 9) | 70 | 55 | 55 | 55 | 0 | 0 |

(Note 6) Salt Spray Resistance:

Each test plate was cross-cut with a knife so that the cut reached the substrate. Each test plate was then subjected to a salt spray test for 840 hours in accordance with JIS Z-2371 and evaluated based on the width of rust or blistering from the cut according to the following criteria:

S: The maximum width of rust or blistering from the cut was less than 2.0 mm (on one side).

A: The maximum width of rust or blistering from the cut was 2.0 mm or more and less than 3.0 mm (on one side).

B: The maximum width of rust or blistering from the cut was 3.0 mm or more and less than 4.0 mm (on one side).

C: The maximum width of rust or blistering from the cut was 4.0 mm or more (on one side).

(Note 7) Hot Salt Water Immersion Resistance:

Each test plate was immersed in 5% by mass of salt water at 50° C. for 840 hours. A Sellotape (trade mark) peeling test was then performed and the percentage (%) of the portion peeled off was measured:

S: Percentage of peeling (%) is less than 5%.

A: Percentage of peeling (%) is 5% or more and less than 10%.

B: Percentage of peeling (%) is 10% or more and less than 20%.

C: Percentage of peeling (%) is 20% or more.

(Note 8) Coating Film Condition:

Each test plate was cut, and the conditions of the coating films (lower-layer film and upper-layer film) were observed using HF-2000 (trade name, a field emission transmission electron microscope manufactured by Hitachi Ltd.) and JXA-8100 (trade name, an electron probe microanalyzer manufactured by JEOL Ltd.). The conditions of the coating films were evaluated according to the following criteria.

A: Layer separation is clearly visible.

B: The boundary between the lower-layer film and the upper-layer film is not clear, but layer separation is visible to some extent.

C: No layer separation is visible.

(Note 9) Metal Amount of Zirconium (%):

The metal amount in the lower-layer film (% by mass) was measured using JY-5000RF (trade name, a glow discharge optical emission spectrometer manufactured by Horiba Ltd.) and RIX-3100 (trade name, an X-ray fluorescence spectrometer manufactured by Rigaku Corporation).

The invention claimed is:

1. A coated article obtained by immersing a substrate to be coated, which has not been subjected to cationic electrodeposition, in a bath of a cationic electrodeposition coating composition comprising: an amino group-containing modified epoxy resin (A); a blocked polyisocyanate curing agent (B); a water-soluble zirconium compound (C); and sulfamic acid, wherein the cationic electrodeposition coating composition comprises the water-soluble zirconium compound (C) in an amount of 10 to 10,000 ppm, calculated as the mass of the elemental zirconium relative to the mass of the cationic electrodeposition coating composition, and wherein the amino group-containing modified epoxy resin (A) is a resin prepared by reacting an epoxy resin (A1) with an amino group-containing compound (a4), the epoxy resin (A1) being prepared by reacting a diepoxide compound (a1), a bisphenol-type epoxy resin (a2), and a bisphenol compound (a3), the diepoxide compound (a1) being represented by the following Formula (1), Formula (1)

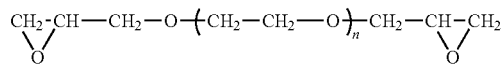

wherein n represents an integer of 1 to 50, and performing electrodeposition coating thereon by applying an electric current at a voltage of 75 to 370 V for 60 to 600 seconds to the substrate to be coated, wherein an acid concentration attributable to sulfamic acid in the cationic electrodeposition coating composition is within a range of 10 to 50 milligram equivalents of sulfamic acid per 100 g of a solids content of the coating composition.

2. A method for forming a film, the method comprising the steps of:

immersing a substrate to be coated in a bath of the cationic electrodeposition coating composition according to claim 1; and applying electricity to the immersed substrate to be coated.

* * * * *